US 10,407,100 B2

(12) United States Patent
Onoda et al.

(10) Patent No.: US 10,407,100 B2
(45) Date of Patent: Sep. 10, 2019

(54) VEHICLE BODY FRAME STRUCTURE

(71) Applicant: TOYOTA JIDOSHA KABUSHIKI KAISHA, Toyota-shi (JP)

(72) Inventors: Masahiro Onoda, Toyota (JP); Keiji Yamaguchi, Toyota (JP); Yoshiki Komatsu, Toyota (JP); Kento Shigeishi, Toyota (JP); Takaaki Onodera, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 56 days.

(21) Appl. No.: 15/831,460

(22) Filed: Dec. 5, 2017

(65) Prior Publication Data
US 2018/0201323 A1    Jul. 19, 2018

(30) Foreign Application Priority Data

Jan. 13, 2017 (JP) .................................. 2017-004553

(51) Int. Cl.
*B62D 21/15* (2006.01)
*B62D 27/02* (2006.01)
*B62D 21/03* (2006.01)

(52) U.S. Cl.
CPC .......... *B62D 21/152* (2013.01); *B62D 21/03* (2013.01); *B62D 27/02* (2013.01)

(58) Field of Classification Search
CPC ............................. B62D 21/152; B62D 21/03
See application file for complete search history.

(56) References Cited

U.S. PATENT DOCUMENTS

| 6,460,889 B2 * | 10/2002 | Iyanagi | B62D 21/152 |
| | | | 280/784 |
| 6,938,948 B1 * | 9/2005 | Cornell | B62D 21/152 |
| | | | 296/187.09 |
| 7,762,619 B2 * | 7/2010 | Baccouche | B62D 21/152 |
| | | | 296/187.09 |
| 8,727,380 B2 * | 5/2014 | Akaki | B62D 21/02 |
| | | | 280/124.109 |
| 9,233,716 B2 * | 1/2016 | Midoun | B62D 21/152 |
| 9,296,427 B1 * | 3/2016 | Kim | B62D 25/082 |
| 9,956,861 B2 * | 5/2018 | Nomura | B60K 1/04 |
| 10,137,933 B2 * | 11/2018 | Chiang | B62D 21/152 |
| 10,150,509 B2 * | 12/2018 | McConnell | B62D 21/155 |
| 2015/0246690 A1 | 9/2015 | Matsumoto et al. | |

(Continued)

FOREIGN PATENT DOCUMENTS

| DE | 102016000755 A1 * | 8/2016 | .......... B62D 21/152 |
| JP | 2009-196438 A | 9/2009 | |

(Continued)

*Primary Examiner* — Nicole T Verley
(74) *Attorney, Agent, or Firm* — Oblon, McClelland, Maier & Neustadt, L.L.P.

(57) ABSTRACT

The present disclosure provides a vehicle body frame structure including: a side rail extending in a vehicle longitudinal direction and disposed so as to face a front tire in a vehicle transverse direction; a cab mount member projecting toward a vehicle transverse direction outer side, from a region of the side rail that is further toward a vehicle rear side than the front tire, and to which a body is mounted; and a projecting portion projecting toward the front tire from a region of the cab mount member that is away from the side rail in the vehicle transverse direction.

5 Claims, 10 Drawing Sheets

(56) References Cited

U.S. PATENT DOCUMENTS

| | | | |
|---|---|---|---|
| 2015/0321700 A1 | 11/2015 | Onoda et al. | |
| 2018/0065669 A1* | 3/2018 | Ghislieri | B62D 21/152 |
| 2019/0106072 A1* | 4/2019 | Uchiba | B60R 19/34 |

FOREIGN PATENT DOCUMENTS

| | | | |
|---|---|---|---|
| JP | 2009-226971 A | 10/2009 | |
| JP | 2015-166207 | 9/2015 | |
| JP | 2015-214197 | 12/2015 | |
| WO | WO-2014192176 A1 * | 12/2014 | B62D 21/152 |
| WO | WO-2017199386 A1 * | 11/2017 | B62D 21/152 |

* cited by examiner

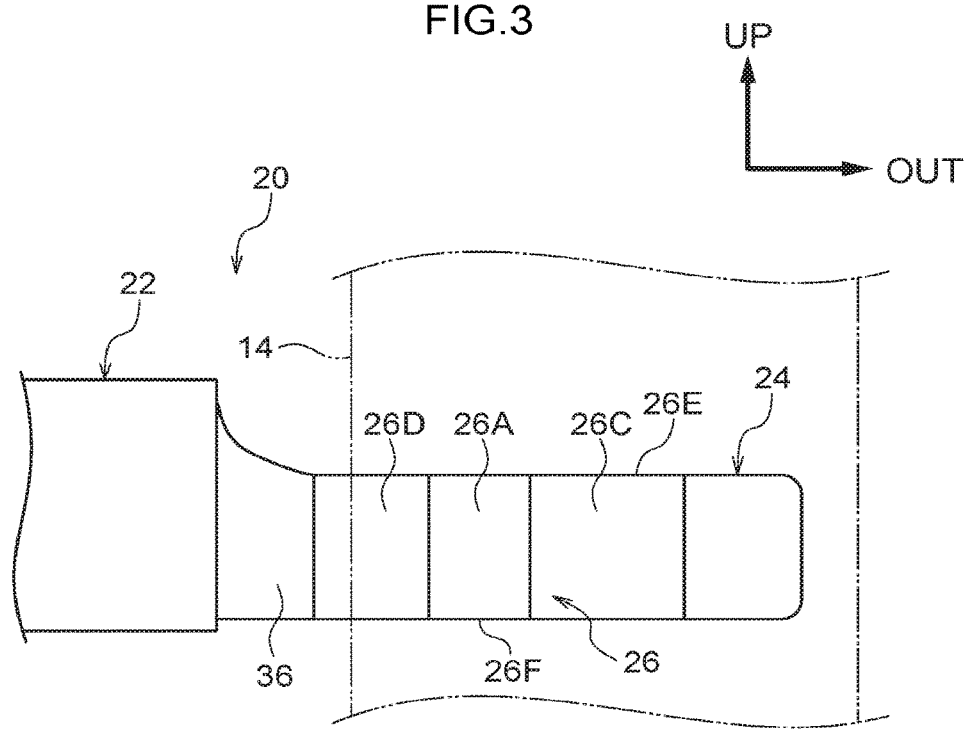

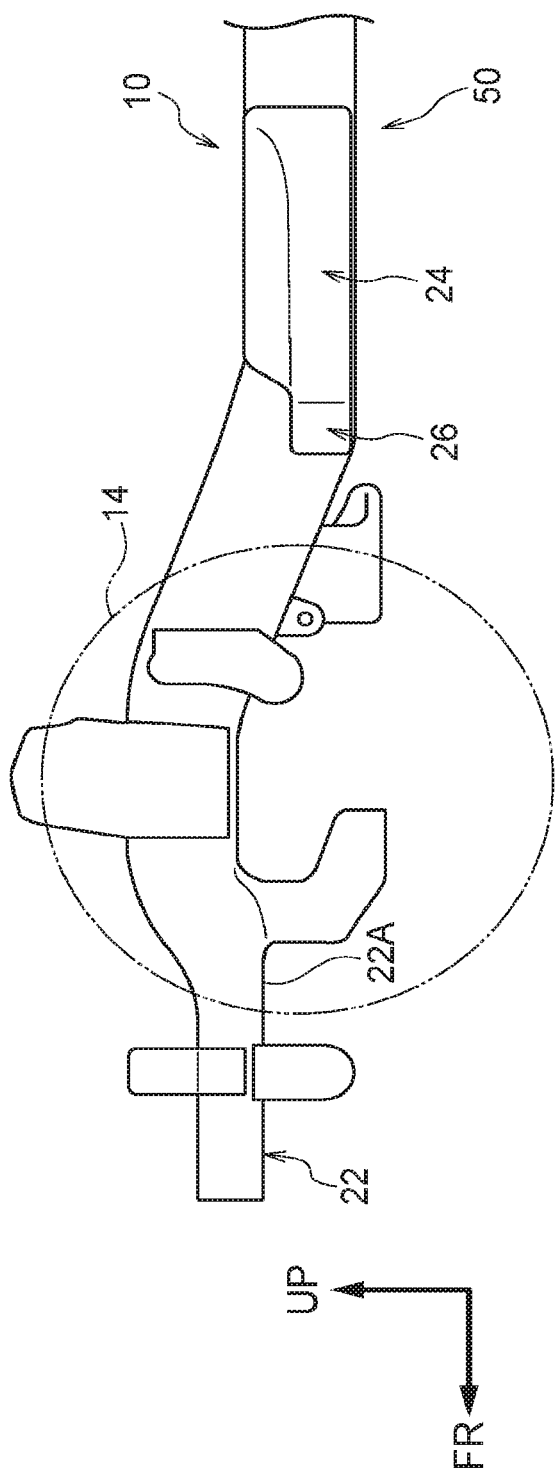

VEHICLE BODY FRAME STRUCTURE

CROSS-REFERENCE TO RELATED APPLICATION

This application claims priority under 35 USC 119 from Japanese Patent Application No. 2017-004553, filed on Jan. 13, 2017, the disclosure of which is incorporated by reference herein.

BACKGROUND

Technical Field

The present disclosure relates to a vehicle body frame structure.

Related Art

Japanese Patent Application Laid-Open (JP-A) No. 2015-214197 discloses a vehicle front portion structure having a side rail that has a bent portion at the vehicle rear side of a front tire, and a projecting portion that projects toward the vehicle transverse direction outer side from the bent portion. The projecting portion is structured to include a cab mount bracket, and an inclined member that is provided at the vehicle front side of the cab mount bracket and is joined to the cab mount bracket.

In a vehicle having side rails, at the time of a front collision, collision energy is absorbed by the side rails deforming. Here, in a case in which the side rails are structured to as to deform easily at the time of a front collision, at the time of an offset collision, the side rail deforms more than needed, and the front tire may move toward the vehicle cabin side.

On the other hand, in a case in which members are provided at the side rails in order to make it difficult for the side rails to deform at the time of a front collision, the absorbed amount of collision energy decreases because it is difficult for the side rails to deform at the time of a front collision.

Namely, there is room for improvement in achieving both suppression of movement of the front tire toward the vehicle cabin side at the time of an offset collision, and suppression of a decrease in the absorbed amount of collision energy at the side rail at the time of a front collision.

SUMMARY

The present disclosure provides a vehicle body frame structure that may achieve both suppression of movement of the front tire toward the vehicle cabin side at the time of an offset collision, and suppression of a decrease in the absorbed amount of collision energy at the side rail at the time of a front collision.

A first aspect of the present disclosure is a vehicle body frame structure including: a side rail extending in a vehicle longitudinal direction and disposed so as to face a front tire in a vehicle transverse direction; a cab mount member projecting toward a vehicle transverse direction outer side, from a region of the side rail that is further toward a vehicle rear side than the front tire, and to which a body is mounted; and a projecting portion projecting toward the front tire from a region of the cab mount member that is away from the side rail in the vehicle transverse direction.

In the vehicle body frame structure of the first aspect of the present disclosure, when the side rail deforms and the front tire moves toward the vehicle cabin side at the time of an offset collision, the front tire contacts the projecting portion. Due thereto, movement of the front tire toward the vehicle cabin side is restricted. Moreover, the collision load that is inputted from the front tire to the projecting portion is transmitted through the cab mount member to the side rail. Therefore, deformation of the projecting portion and the cab mount member is suppressed, and movement of the front tire toward the vehicle cabin side may be suppressed.

On the other hand, at the time of a front collision, the side rail deforms, and collision energy is absorbed. At this time, because the projecting portion is disposed so as to be away from the side rail, it is difficult for the deformation of the side rail to be restrained by the projecting portion. Thus, a reduction in the amount of collision energy that is absorbed at the side rail at the time of a front collision may be suppressed.

In a second aspect of the present disclosure, in the above-described aspect, a first curved portion, which may be curved such that a vehicle longitudinal direction rear side thereof may be positioned further toward a vehicle transverse direction outer side than a front side thereof, and a second curved portion, which may be disposed further toward a rear side than the first curved portion and may be curved so as to run along the vehicle longitudinal direction, are formed at the side rail; and as seen in a vehicle plan view, the cab mount member may project toward a vehicle transverse direction outer side from a region that is further toward a vehicle longitudinal direction rear side than an apex of an arc of a vehicle transverse direction outer side surface of the second curved portion. Note that the apex of the arc of the outer side surface means the point at which the arc of the outer side surface is divided into two equal parts as seen in a vehicle plan view.

In the vehicle body frame structure of the second aspect of the present disclosure, at the time of a front collision, the side rail deforms between the first curved portion and the second curved portion, and collision energy is absorbed. Here, the apex of the arc of the vehicle transverse direction outer side surface of the second curved portion, and the peripheral portion of the apex, are the region that deforms. On the other hand, the cab mount member projects from a region that is further toward the vehicle longitudinal direction rear side than this apex. Namely, the cab mount member is disposed further toward the rear side than the region of the side rail that deforms. Thus, the cab mount member restraining the deformation of the side rail can be suppressed.

In a third aspect of the present disclosure, in the above-described aspects, a facing surface of the cab mount member that faces the front tire in the vehicle longitudinal direction, may be inclined such that a vehicle transverse direction outer side end thereof is positioned further toward a vehicle longitudinal direction front side than an inner side end thereof, as seen in a vehicle plan view.

In the vehicle body frame structure of the third aspect of the present disclosure, the outer side end of the cab mount member is positioned further toward the front side than the inner side end. Here, at the time of an offset collision, the front tire moves from the vehicle transverse direction outer side toward the inner side. Thus, the cab mount member and the front tire can be made to contact one another from the initial stage of the collision, as compared with a structure in which the outer side end and the inner side end of the cab mount member are lined-up in the vehicle transverse direction. In other words, because, at the time of an offset collision, the front tire and the projecting portion are made to contact one another from the initial stage of the collision, movement of the front tire toward the vehicle cabin side may be suppressed more.

In a fourth aspect of the present disclosure, in the above-described aspects, an inclined surface, which may be inclined such that a rear end thereof is positioned further toward a vehicle transverse direction outer side than a front end thereof as seen in a vehicle plan view, may be formed at a vehicle transverse direction outer side region at the projecting portion.

In the vehicle body frame structure of the fourth aspect of the present disclosure, in a case in which the front tire moves from the vehicle transverse direction outer side toward the inner side and contacts the projecting portion at the time of an offset collision, the front tire contacts the inclined surface. Here, the surface area of the surface that is orthogonal to the moving direction of the front tire is wider at the inclined surface than at the distal end surface of the projecting portion. Namely, by forming the inclined surface, the contact surface area between the front tire and the projecting portion can be increased. Moreover, the inclined surface is inclined such that the rear end thereof is positioned further toward the vehicle transverse direction outer side than the front end thereof. Due thereto, the width of the projecting portion in the vehicle transverse direction is wider at the cab mount member side than at the distal end side. Therefore, the yield strength of the projecting portion with respect to the inputted collision load is high as compared with a structure in which the projecting portion is rectangular. In this way, by forming the inclined surface, the surface area of contact between the front tire and the projecting portion is increased, and the yield strength of the projecting portion is increased. Thus, movement of the front tire toward the vehicle cabin side may be suppressed more.

In a fifth aspect of the present disclosure, in the above-described aspects, a cross member that extends in the vehicle transverse direction may be joined to the side rail; and the cab mount member may project out from the side rail such that, as seen in a vehicle plan view, a vehicle transverse direction end portion of the cross member is disposed further toward a rear side than the projecting portion and further toward a vehicle longitudinal direction front side than an imaginary line that extends from a rear surface at a vehicle longitudinal direction rear side of the cab mount member.

In the vehicle body frame structure of the fifth aspect of the present disclosure, the end portion of the cross member is disposed in the direction of transmission of the collision load that is inputted to the cab mount member due to the front tire contacting the projecting portion at the time of an offset collision. Due thereto, it is easy for the collision load, which is inputted to the cab mount member via the projecting portion, to be transmitted not only to the side rail, but also to the cross member. Thus, movement of the front tire toward the vehicle cabin side may be suppressed more.

In accordance with the vehicle body frame structure of the first aspect, both suppression of movement of the front tire toward the vehicle cabin side at the time of an offset collision, and suppression of a decrease in the amount of collision energy that is absorbed at the side rail at the time of a front collision, may be achieved.

In accordance with the vehicle body frame structure of the second aspect, the cab mount member restraining the deformation of the side rail may be suppressed.

In accordance with the vehicle body frame structures of the third through fifth aspects, movement of the front tire toward the vehicle cabin side may be suppressed more.

BRIEF DESCRIPTION OF THE DRAWINGS

Exemplary embodiments will be described in detail based on the following figures, wherein:

FIG. 3 is a front view in which the cab mount member and the projecting portion relating to the first embodiment are seen from the front of the vehicle;

FIG. 6B is a side view of a portion of the frame portion of the vehicle to which the vehicle body frame structure relating to the second embodiment is applied;

DETAILED DESCRIPTION

First Embodiment

Figure 1:
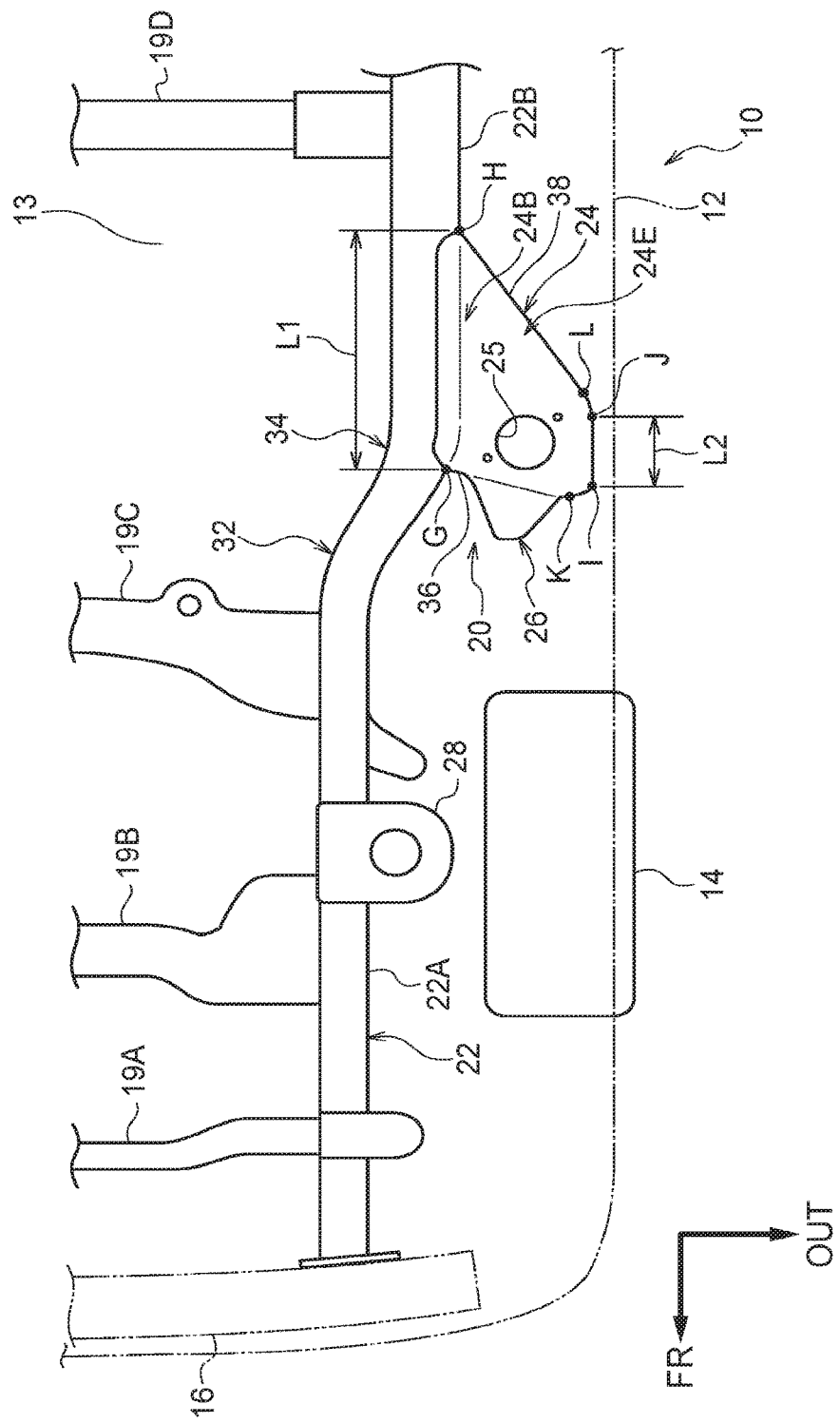
FIG. 1 is a plan view of a portion of a frame portion of a vehicle to which a vehicle body frame structure relating to a first embodiment is applied.

The frame portion of a vehicle 10 relating to the present embodiment is illustrated in FIG. 1. Note that arrow FR that is shown appropriately in the respective drawings indicates the vehicle front side (the advancing direction), arrow UP indicates the vehicle upper side, IN indicates the vehicle transverse direction inner side, and OUT indicates the vehicle transverse direction outer side. Hereinafter, when merely longitudinal, vertical, and left-right directions are used, unless otherwise specified, they indicate the longitudinal of the vehicle body longitudinal direction, the vertical of the vehicle body vertical direction, and the left and right of the vehicle transverse direction in a case of facing in the advancing direction.

The vehicle 10 is structured as a vehicle having a frame structure (a frame vehicle), and has a body 12. The body 12 is joined via plural, body mounts (not illustrated in the drawings) to outriggers 24 that are described later. A vehicle cabin 13 is formed at the body 12. Moreover, a vehicle body frame structure 20 relating to the present embodiment is applied to the vehicle 10.

Vehicle Body Frame Structure

The vehicle body frame structure 20 has a side rail 22, the outrigger 24 that serves as an example of a cab mount member, and a projecting portion 26. Note that, as an example, the vehicle body frame structure 20 is structured so as to have left-right symmetry with respect to vehicle transverse direction center of the vehicle 10. Therefore, here, the vehicle body frame structure 20 at the left side is illustrated and described, and illustration and description of the vehicle body frame structure 20 at the right side is omitted.

The side rail 22 extends in the vehicle longitudinal direction at the vehicle transverse direction outer side of the vehicle 10. As an example, when viewed from the vehicle longitudinal direction, steel members (a side rail inner and a side rail outer) that have U-shaped cross-sections are joined together in a state of facing one another in the vehicle transverse direction, and the side rail 22 has a closed cross-sectional shape that is hollow and rectangular.

A front tire 14 is disposed at the vehicle transverse direction outer side of a front portion 22A side in the vehicle longitudinal direction of the side rail 22. In other words, the side rail 22 is disposed so as to face the front tire 14 in the vehicle transverse direction. Therefore, in consideration of avoiding interference with the front tires 14, at the front portion 22A sides of the pair of left and right side rails 22, the dimension (the interval therebetween) in the vehicle transverse direction is set to be shorter than that at intermediate portion 22B sides that are positioned at the vehicle longitudinal direction intermediate regions of the side rails 22.

As seen in a vehicle plan view (as seen from the upper side in the vehicle vertical direction), a first curved portion 32 and a second curved portion 34 are formed between the front portion 22A and the intermediate portion 22B of the side rail 22. Note that details of the first curved portion 32 and the second curved portion 34 are described later. In consideration of the placement of the suspension unit and the like, the front portion 22A of the side rail 22 is disposed further toward the vehicle upper side than the intermediate portion 22B. Namely, the front portion 22A of the side rail 22 projects toward the vehicle upper side at the vehicle longitudinal direction intermediate region.

A bumper reinforcement 16 spans between the front end portions of the front portions 22A of the pair of side rails 22 along the vehicle transverse direction. The bumper reinforcement 16 is a structure whose vehicle transverse direction outer side end portions are curved toward the vehicle rear side with respect to the vehicle transverse direction central portion thereof. A cross member 19A, a cross member 19B, a cross member 19C and a cross member 19D extend along the vehicle transverse direction between the pair of side rails 22 and further toward the vehicle rear side than the bumper reinforcement 16. Namely, the cross member 19A, the cross member 19B, the cross member 19C and the cross member 19D span between the pair of side rails 22 in the vehicle transverse direction in that order from the vehicle front side. Due thereto, a ladder-shaped frame is formed at the vehicle 10.

The cross members 19A, 19B and 19C are provided at the front portion 22A of the side rail 22. The cross member 19D is provided at the intermediate portion 22B. A suspension mount bracket 28, which is made of metal and projects toward the vehicle transverse direction outer side of the side rail 22, is disposed at the front portion 22A of the side rail 22 between the cross member 19B and the cross member 19C. A suspension mount (not illustrated in the drawings) is mounted to the suspension mount bracket 28. This is a structure in which a suspension unit (not illustrated in the drawings) can be connected to the side rail 22 via the suspension mount and the suspension mount bracket 28.

The first curved portion 32 is formed at a region of the side rail 22 which region is further toward the rear side than the region that is joined to the cross member 19C. Further, the first curved portion 32 is a region that is curved from the front portion 22A, which runs along the vehicle longitudinal direction, such that the vehicle longitudinal direction rear side of the first curved portion 32 is positioned further toward the vehicle transverse direction outer side than the front side thereof. In other words, the first curved portion 32 is a region that is curved so as to head toward the vehicle transverse direction outer side while heading toward the vehicle rear side from the front portion 22A of the side rail 22. As seen in a vehicle plan view, a center of curvature of the first curved portion 32 is positioned at the vehicle transverse direction outer side with respect to the side rail 22. Moreover, as seen in a vehicle side view (as seen from the vehicle transverse direction), the first curved portion 32 is inclined so as to head toward the vehicle vertical direction lower side while heading from the front portion 22A toward the vehicle rear side.

Figure 2:
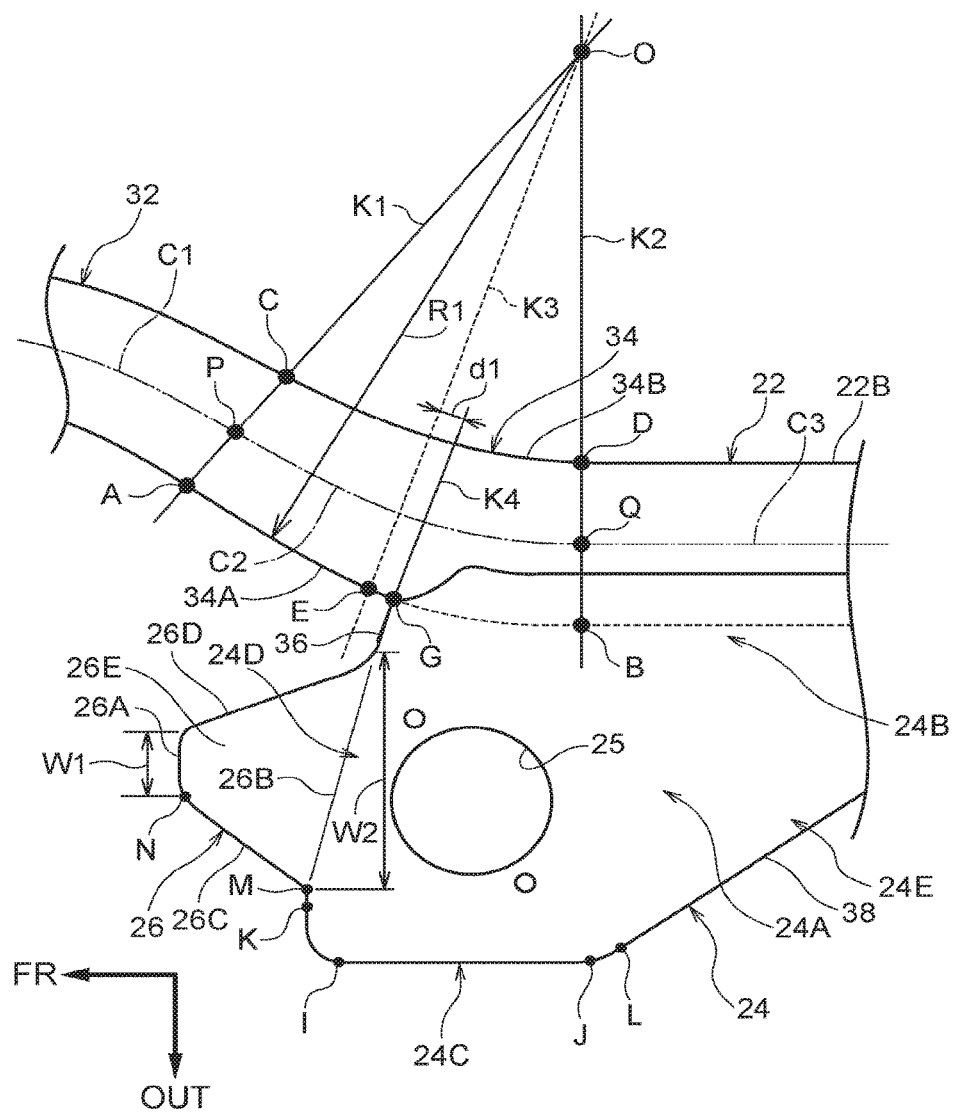
FIG. 2 is a plan view showing a side rail, a cab mount member, and a projecting portion relating to the first embodiment.

As shown in FIG. 2, the second curved portion 34 is disposed further toward the vehicle longitudinal direction rear side than the first curved portion 32. Concretely, the second curved portion 34 is a region that is formed in continuation with the vehicle longitudinal direction rear end of the first curved portion 32, and that is curved such that the vehicle longitudinal direction rear side thereof is positioned further toward the vehicle transverse direction outer side than the front side thereof. In other words, the second curved portion 34 is a region that is curved so as to gradually head toward the vehicle rear side (toward the rectilinear intermediate portion 22B side) (i.e., so as to run along the vehicle longitudinal direction) while heading from the rear end of the first curved portion 32 toward the vehicle transverse direction outer side. As seen in a vehicle plan view, center of curvature O that is described later of the second curved portion 34 is positioned at the vehicle transverse direction inner side with respect to the side rail 22. Moreover, as seen in a vehicle side view, the second curved portion 34 is a shape that is such that the inclination thereof with respect to the vehicle longitudinal direction becomes smaller (approaches substantially horizontal) while heading from the first curved portion 32 toward the intermediate portion 22B that is at the vehicle rear side.

In FIG. 2, central axis C1 of the first curved portion 32, central axis C2 of the second curved portion 34, and central axis C3 of the intermediate portion 22B are respectively shown by one-dot chain lines. The point where the central axis C1 and the central axis C2 are connected is inflection point P, and the point where the central axis C2 and the central axis C3 are connected is inflection point Q. Namely, the second curved portion 34 is a region of the side rail 22 that is structured from inflection point P to inflection point Q. Further, as seen in a vehicle plan view, the side surface that is positioned at the vehicle transverse direction outer side of the second curved portion 34 is outer side surface 34A, and the side surface that is positioned at the vehicle transverse direction inner side of the second curved portion 34 is inner side surface 34B.

As an example, the outer side surface 34A is formed in the shape of an arc whose center of curvature is O and whose radius of curvature is R1. The point where straight line K1, which passes through the center of curvature O and the inflection point P, intersects the outer side surface 34A is end point A. The point where straight line K2, which passes through the center of curvature O and the inflection point Q, intersects the outer side surface 34A is end point B. Namely, the outer side surface 34A is expressed as arc AB as seen in a vehicle plan view. Further, the point where the straight line K1 intersects the inner side surface 34B is end point C, and the point where the straight line K2 intersects the inner side surface 34B is end point D. Namely, as an example, the inner side surface 34B is expressed as arc CD as seen in a vehicle plan view. Although not illustrated, the radius of curvature of the inner side surface 34B is smaller than the radius of curvature of the outer side surface 34A. In the present embodiment, the starting point of deformation of the side rail 22 at the time of a collision is set within the range of the arc CD.

Here, the "apex of the arc of the outer side surface" means "the point where the arc of the outer side surface is divided into two equal parts as seen in a vehicle plan view". In the present embodiment, as an example, the outer side surface 34A is formed in the shape of an arc, and therefore, point E, where the arc AB is divided into two equal parts as seen in a vehicle plan view, is the apex of the arc AB of the outer side surface 34A. Note that the straight line that passes through the center of curvature O and point E is straight line K3, and is shown by a dashed line.

The outrigger 24 shown in FIG. 1 projects toward the vehicle transverse direction outer side from a region of the side rail 22 which is further toward the vehicle rear side than the front tire 14, and is disposed so as to face the front tire 14 in the vehicle longitudinal direction. Concretely, the outrigger 24 projects toward the vehicle transverse direction outer side from the side rail 22 within a range from the vehicle longitudinal direction rear side portion of the second curved portion 34 to the front portion of the intermediate portion 22B. The side rail 22 and the outrigger 24 are welded together. A mounting hole 25 that passes-through in the vehicle vertical direction is formed in the outrigger 24. A body mount (not illustrated in the drawings) is mounted to the mounting hole 25, and the body 12 is mounted to the outrigger 24 via this body mount.

Further, the outrigger 24 is structured to include an upper bracket and a lower bracket (not illustrated in the drawings), and, as seen in a vehicle plan view, is formed substantially in the shape of a trapezoid at which the vehicle transverse direction outer side is the upper base side and the inner side is the lower base side. As shown in FIG. 2, the outrigger 24 is structured by a main body portion 24A, a root portion 24B, a distal end portion 24C, a front portion 24D and a rear portion 24E.

The aforementioned mounting hole 25 is formed in the main body portion 24A. The root portion 24B is welded to the vehicle transverse direction outer side surface of the side rail 22. The distal end portion 24C is positioned at the side of the main body portion 24 which is, in the vehicle transverse direction, opposite the root portion 24B side. The front portion 24D structures the front side portion in the vehicle longitudinal direction with respect to the main body portion 24A. The front portion 24D has a front surface 36 that is described later. The rear portion 24E structures the rear side portion in the vehicle longitudinal direction with respect to the main body portion 24A. The rear portion 24E has a rear surface 38 that is described later. The root portion 24B side corresponds to the lower base side of the trapezoid, and the distal end portion 24C side corresponds to the upper base side of the trapezoid.

As shown in FIG. 1, as seen in a vehicle plan view, the point corresponding to the vehicle longitudinal direction front end of the root portion 24B is end point G, and the point corresponding to the rear end is end point H. The length along the vehicle longitudinal direction from end point G to end point H is L1. Further, as seen in a vehicle plan view, the point corresponding to the vehicle longitudinal direction front end of the distal end portion 24C is end point I, and the point corresponding to the rear end is end point J. The length along the vehicle longitudinal direction from end point I to end point J is L2. Here, these lengths are set such that L1>L2. Further, as seen in a vehicle side view, end point G, end point H, end point I, and end point J are lined-up in the order of end point I, end point G, end point J and end point H from the vehicle longitudinal direction front side toward the rear side.

As shown in FIG. 2, end point G of the root portion 24B of the outrigger 24 is positioned further toward the vehicle longitudinal direction rear side than point E of the above-described second curved portion 34. Note that, in FIG. 2, the distance between point E and end point G in the axial direction of the side rail 22 is expressed as d1. In other words, as seen in a vehicle plan view, the outrigger 24 projects toward the vehicle transverse direction outer side from a region that is further toward the vehicle longitudinal direction rear side than the apex (point E) of the arc AB of the vehicle transverse direction outer side surface 34A of the second curved portion 34.

A facing surface of the outrigger 24 shown in FIG. 1, which facing surface faces the front tire 14 in the vehicle longitudinal direction, is the front surface 36. The vehicle transverse direction inner side end of the front surface 36 is end point G. Further, the vehicle transverse direction outer side end of the front surface 36 is end point K. As an example, end point K is disposed further toward the vehicle transverse direction inner side and the vehicle longitudinal direction front side than end point I. Here, as seen in a vehicle plan view, the vehicle transverse direction outer side end (end point K) of the front surface 36 is positioned further toward the vehicle longitudinal direction front side than the inner side end (end point G). Namely, the front surface 36 is inclined at a preset angle with respect to the vehicle transverse direction.

The surface that is formed at the rear portion 24E of the outrigger 24 (the surface at the rear side in the vehicle longitudinal direction) is the rear surface 38. The point corresponding to the vehicle transverse direction inner side end of the rear surface 38 is end point H. The point corresponding to the vehicle transverse direction outer side end of the rear surface 38 is end point L. As an example, end point L is disposed further toward the vehicle transverse direction inner side and the vehicle longitudinal direction rear side than end point J. Here, as seen in a vehicle plan view, the vehicle transverse direction outer side end (end point L) of the rear surface 38 is positioned further toward the vehicle longitudinal direction front side than the inner side end (end point H). Namely, the rear surface 38 is inclined at a preset angle with respect to the vehicle transverse direction. Further, as an example, the angle of inclination of the rear surface 38 with respect to the vehicle transverse direction is set to be an angle that is greater than the angle of inclination of the front surface 36 with respect to the vehicle transverse direction. Note that, as seen in a vehicle side view, end point H is set further toward the vehicle longitudinal direction front side than the aforementioned cross member 19D.

As shown in FIG. 2, the projecting portion 26 projects toward the vehicle longitudinal direction front side toward the front tire 14 (see FIG. 1) from a region of the front surface 36 of the outrigger 24 which region is away, toward the vehicle transverse direction outer side, from the side rail 22. Note that, in the present embodiment, the outrigger 24 and the projecting portion 26 are formed integrally as an example.

As an example, the projecting portion 26 is formed in a substantially quadrangular shape as seen in a vehicle plan view, and is formed in the shape of a substantially quadrangular pillar whose height direction is the vehicle vertical direction. Concretely, the projecting portion 26 has a distal end surface 26A, a rear end surface 26B, a first side surface 26C that serves as an example of an inclined surface, a second side surface 26D, a top surface 26E, and a bottom surface 26F (see FIG. 3).

As an example, the distal end surface 26A is formed along the vehicle transverse direction and the vehicle vertical direction at a position that is further toward the vehicle longitudinal direction front side than the inflection point P as seen in a vehicle side view. The width of the distal end surface 26A in the vehicle transverse direction is W1. As shown in FIG. 3, the distal end surface 26A is formed in a substantially rectangular shape as seen in a vehicle front view. Further, the distal end surface 26A is formed at a position of the projecting portion 26 which position overlaps the vehicle transverse direction central portion of the outrigger 24 in the vehicle longitudinal direction. Moreover, as seen in a vehicle front view, the distal end surface 26A is formed at a position that overlaps the front tire 14 in the vehicle longitudinal direction.

The rear end surface 26B that is shown in FIG. 2 is a surface that overlaps the front surface 36 of the outrigger 24 as seen in a vehicle plan view, and is set as an imaginary surface. In the same way as the front surface 36, the rear end surface 26B is inclined at a preset angle with respect to the vehicle transverse direction. The width of the rear end surface 26B in the vehicle transverse direction is W2, and W2>W1.

The first side surface 26C is the side surface that is formed at the vehicle transverse direction outer side region of the projecting portion 26. As seen in a vehicle plan view, the first side surface 26C is inclined such that the point (shown by point M) that corresponds to the rear end is positioned further toward the vehicle transverse direction outer side than the point (shown by point N) that corresponds to the front end. The angle of inclination of the first side surface 26C with respect to the vehicle longitudinal direction is set in accordance with the predicted direction of movement of the front tire 14 (see FIG. 1) at the time of a collision.

As shown in FIG. 3, as seen in a vehicle front view, the first side surface 26C is formed in a substantially rectangular shape. Further, as seen in a vehicle front view, the first side surface 26C is formed at a position that overlaps the front tire 14 in the vehicle longitudinal direction. The surface area of the first side surface 26C is set to be large as compared with the surface area of the distal end surface 26A.

The second side surface 26D that is shown in FIG. 2 is the side surface of the projecting portion 26 that is formed at the vehicle transverse direction inner side region. Further, as seen in a vehicle plan view, the second side surface 26D is inclined such that the rear end thereof is positioned further toward the vehicle transverse direction inner side than the front end thereof. The angle of inclination of the second side surface 26D with respect to the vehicle longitudinal direction is determined in accordance with the layout of the distal end surface 26A and the rear end surface 26B in the vehicle transverse direction.

As shown in FIG. 3, in a vehicle front view, the second side surface 26D is formed in a substantially rectangular shape. Further, as seen in a vehicle front view, a portion of the second side surface 26D is formed at a position that overlaps the front tire 14 in the vehicle longitudinal direction. As an example, the surface area of the second side surface 26D is set to be large as compared with the surface area of the first side surface 26C.

The top surface 26E covers the upper ends of the distal end surface 26A, the rear end surface 26B (see FIG. 2), the first side surface 26C and the second side surface 26D. The bottom surface 26F covers the lower ends of the distal end surface 26A, the rear end surface 26B, the first side surface 26C and the second side surface 26D.

A structure in which, as compared with the vehicle body frame structure 20 of the present embodiment, the projecting portion 26 is omitted and the second curved portion 34 of the side rail 22 is reinforced such that it is difficult for the second curved portion 34 to bend, is a vehicle body frame structure of a comparative example. Note that illustration of the vehicle body frame structure of the comparative example is omitted.

Figure 5:
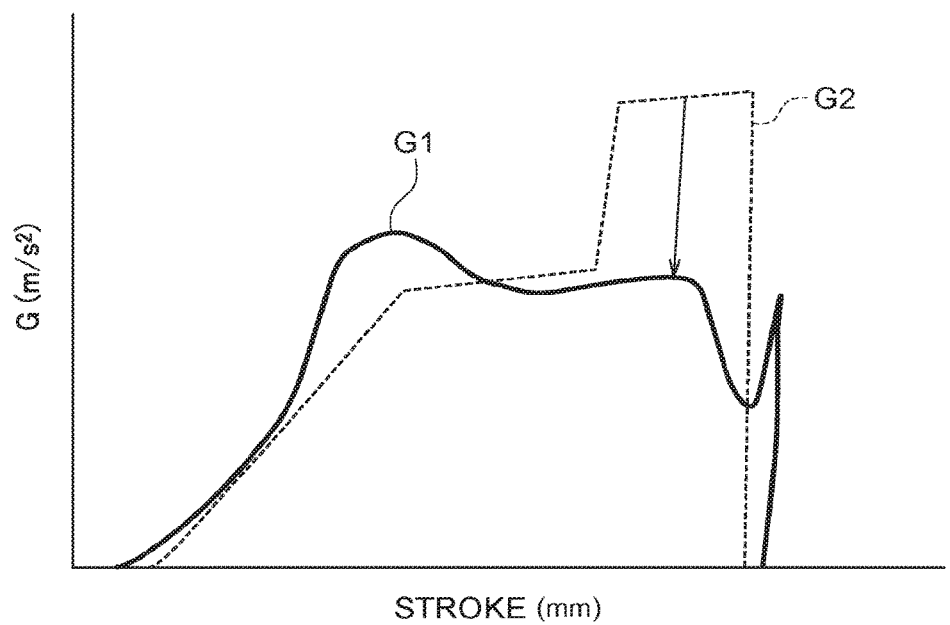
FIG. 5 is a graph showing the relationship between crash stroke and acceleration applied to a vehicle cabin, in the vehicle body frame structure relating to the first embodiment and a vehicle body frame structure relating to a comparative example.

In FIG. 5, the relationship between stroke (crash stroke, in units of mm) at the time of a front collision of the vehicle 10 (see FIG. 1), and acceleration G (in units of m/s$^2$) that is applied to the vehicle cabin 13 (see FIG. 1), is shown as graph G1 and graph G2. Graph G1 is a graph that is obtained at the vehicle body frame structure 20 of the present embodiment (see FIG. 1). Graph G2 is a graph that is obtained at the vehicle body frame structure of the comparative example.

As shown by graph G2, in the vehicle body frame structure of the comparative example, because it is difficult for the second curved portion 34 (see FIG. 2) to bend at the time of a front collision, the stroke is short as compared with the vehicle body frame structure 20 (see FIG. 1) of the present embodiment. In other words, in the vehicle body frame structure of the comparative example, due to the stroke being short, the amount of collision energy that is absorbed at the side rail 22 (see FIG. 2) is reduced. Therefore, there are cases in which the acceleration G that is applied to the vehicle cabin 13 (see FIG. 1) is large.

Operation and Effects

Operation and effects of the vehicle body frame structure 20 of the first embodiment are described next.

Figure 4A:
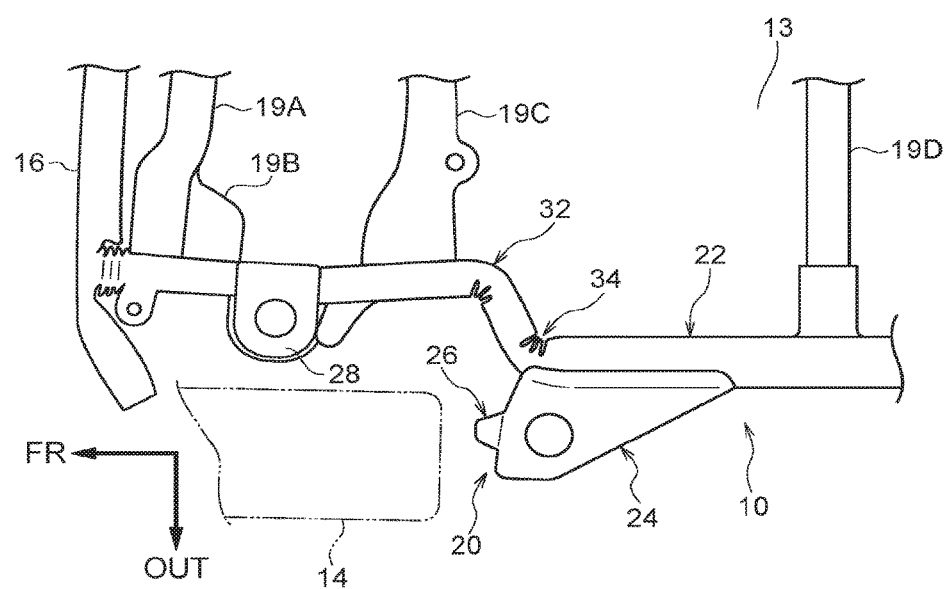
FIG. 4A is an explanatory drawing that shows a deformed state at the time of a front collision of the vehicle body frame structure relating to the first embodiment.

As shown in FIG. 4A, at the vehicle body frame structure 20, in a case in which collision load is inputted from the bumper reinforcement 16 at the time of a front collision of the vehicle 10, the first curved portion 32 and the second curved portion 34 of the side rail 22 deform, and collision energy is absorbed. At this time, because the projecting portion 26 is disposed so as to be away from the side rail 22 in the vehicle transverse direction, it is difficult for the deformation of the side rail 22 to be restrained by the projecting portion 26. Thus, in the vehicle body frame structure 20, a reduction in the amount of collision energy that is absorbed at the side rail 22 at the time of a front collision may be suppressed. Further, at the vehicle body frame structure 20, by suppressing a reduction in the absorbed amount of collision energy, as shown by graph G1 of FIG. 5, the stroke increases as compared with the comparative example, and the acceleration G that is applied to the vehicle cabin 13 (see FIG. 1) becoming larger than in the comparative example may be suppressed. Note that, in FIG. 5, the state in which the acceleration G is lower than that of the comparative example is shown by the downwardly-pointing arrow.

Figure 4B:
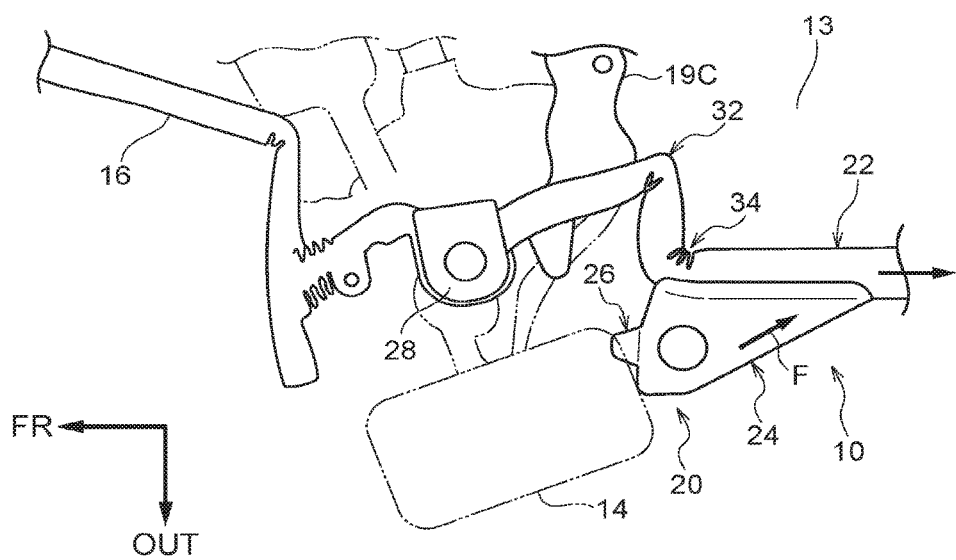
FIG. 4B is an explanatory drawing that shows a deformed state at the time of an offset collision of the vehicle body frame structure relating to the first embodiment.

On the other hand, as shown in FIG. 4B, at the vehicle body frame structure 20, when collision load is inputted to an end portion of the bumper reinforcement 16 at the time of an offset collision of the vehicle 10, the first curved portion 32 and the second curved portion 34 of the side rail 22 deform, and collision energy is absorbed. At this time, there are cases in which, accompanying the deformation of the side rail 22, the front tire 14 moves toward the vehicle cabin 13 side. Here, when the front tire 14 moves toward the vehicle cabin 13 side, the projecting portion 26 contacts the front tire 14. Due thereto, movement of the front tire 14 toward the vehicle cabin 13 side is restricted. Moreover, collision load F that is inputted to the projecting portion 26 from the front tire 14 is transmitted through the outrigger 24 to the side rail 22. Therefore, because deformation of the projecting portion 26 and the outrigger 24 is suppressed, movement of the front tire 14 toward the vehicle cabin 13 side may be suppressed.

As described above, in the vehicle body frame structure 20, suppression of movement of the front tire 14 toward the vehicle cabin 13 side at the time of an offset collision, and suppression of a decrease in the amount of collision energy that is absorbed at the side rail 22 at the time of a front collision, may both be achieved.

Further, in the vehicle body frame structure 20 shown in FIG. 2, the apex (point E) of the arc of the vehicle transverse direction outer side surface 34A of the second curved portion 34, and the peripheral portion of point E, are the region that deforms when collision load is inputted. On the other hand, the outrigger 24 projects toward the vehicle transverse direction outer side from a region (end point G and further toward the rear side than end point G) that is further toward the vehicle longitudinal direction rear side than point E. Namely, the outrigger 24 is disposed further toward the vehicle longitudinal direction rear side than the region of the side rail 22 that deforms. Thus, it is difficult for the outrigger 24 to restrain deformation of the side rail 22. Due thereto, the outrigger 24 restraining the deformation of the side rail 22 may be suppressed.

Moreover, in the vehicle body frame structure 20, the outer side end (end point K) of the front surface 36 of the outrigger 24 is positioned further toward the vehicle longitudinal direction front side than the inner side end (end point G). Here, at the time of an offset collision of the vehicle 10 shown in FIG. 4B, the front tire 14 moves in an oblique direction from the vehicle transverse direction outer side toward the inner side. Thus, the outrigger 24, whose outer side end is positioned further toward the front side than the inner side end, can be made to contact the front tire 14 from an early stage of the collision of the outrigger 24 and the front tire 14, as compared with a structure in which the outer side end and the inner side end are lined-up in the vehicle transverse direction. In other words, at the time of an offset collision, the front tire 14 and the projecting portion 26 are made to contact one another from the initial stage of the collision, and therefore, movement of the front tire 14 toward the vehicle cabin 13 side may be suppressed further.

In addition, at the vehicle body frame structure 20, in a case in which the front tire 14 moves in an oblique direction from the vehicle transverse direction outer side toward the inner side and contacts the projecting portion 26 at the time of an offset collision of the vehicle 10, the front tire 14 contacts the first side surface 26C of the projecting portion 26. Here, the surface area of the surface that is orthogonal to the moving direction of the front tire 14 is greater at the first side surface 26C than at the distal end surface 26A of the projecting portion 26. Namely, at the vehicle body frame structure 20, due to the first side surface 26C that is inclined being formed at the projecting portion 26, the contact surface area of the front tire 14 and the projecting portion 26 can be increased as compared with a structure that does not have the first side surface 26C.

Moreover, the first side surface 26C that is shown in FIG. 2 is inclined such that the rear end thereof is positioned further toward the vehicle transverse direction outer side than the front end thereof. Due thereto, the width in the vehicle transverse direction of the projecting portion 26 is wider at the outrigger 24 side (width W2) than at the distal end side (with W1). Thus, the yield strength of the projecting portion 26 with respect to the inputted collision load is high as compared with a structure in which the projecting portion 26 is formed in a rectangular shape as seen in a vehicle plan view. In this way, by forming the first side surface 26C, the surface area of contact between the front tire 14 and the projecting portion 26 is increased, and the yield strength of the projecting portion 26 is increased, and it is difficult for the outrigger 24 to deform. Due thereto, movement of the front tire 14, which is shown in FIG. 1, toward the vehicle cabin 13 side may be suppressed further.

Second Embodiment

A vehicle body frame structure 50 of a second embodiment is described next.

Figure 6A:
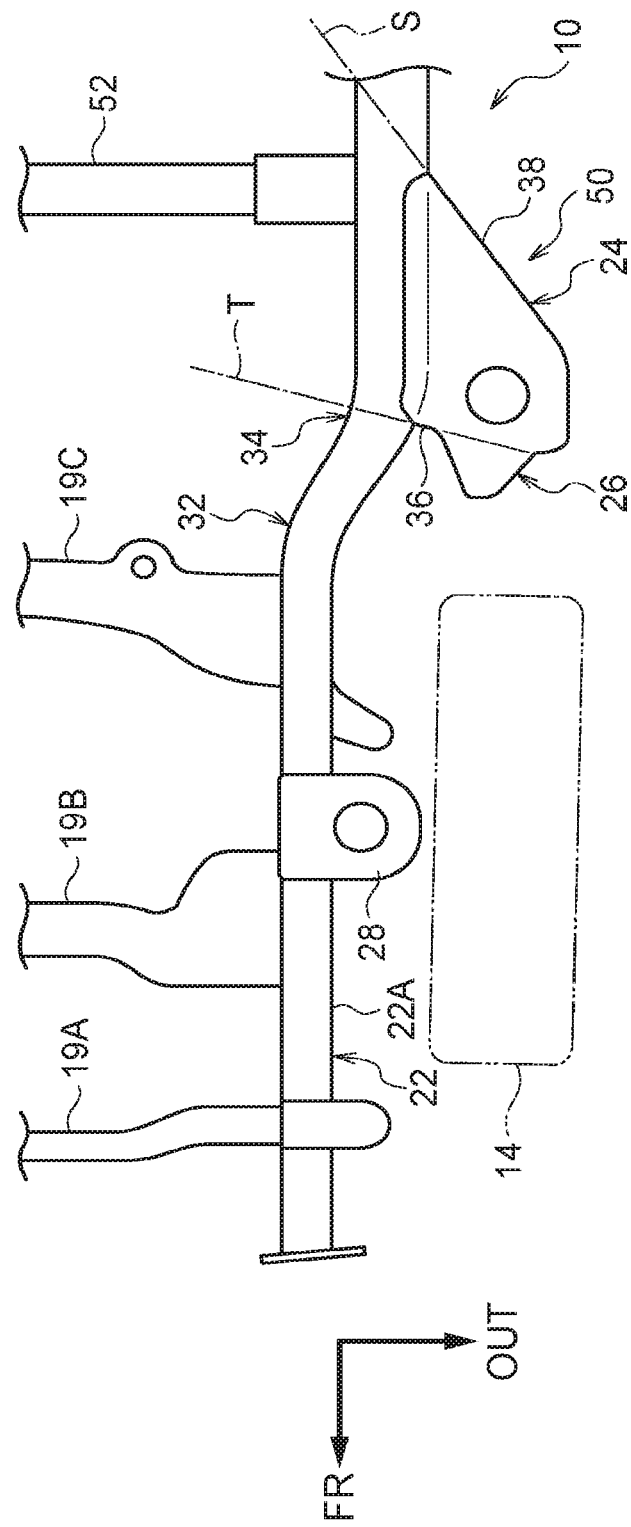
FIG. 6A is a plan view of a portion of a frame portion of the vehicle to which a vehicle body frame structure relating to a second embodiment is applied.

The vehicle body frame structure 50 is shown in FIG. 6A and FIG. 6B. The vehicle body frame structure 50 is provided in place of the vehicle body frame structure 20 (see FIG. 1) in the vehicle 10 of the first embodiment (see FIG. 1). Note that, at the vehicle body frame structure 50, members and regions that are basically the same as those of the above-described first embodiment are denoted by the same reference numerals as in the first embodiment, and description thereof is omitted. Note that illustration of the bumper reinforcement 16 (see FIG. 1) is omitted in FIG. 6A and FIG. 6B.

In the vehicle 10 of the second embodiment that is shown in FIG. 6A, a cross member 52 is provided in place of the cross member 19D (see FIG. 1). The cross member 52 extends in the vehicle transverse direction. The vehicle transverse direction end portion of the cross member 52 is joined to the side rail 22.

As seen in a vehicle plan view, the outrigger 24 projects out from the side rail 22 such that the vehicle transverse direction end portion (the joined portion) of the cross member 52 is disposed further toward the rear side than the projecting portion 26 and further toward the vehicle longitudinal direction front side than an imaginary line S that extends from the rear surface 38 of the outrigger 24. In other words, the rear portion of the outrigger 24 is extended toward the vehicle rear side so as to overlap the cross member 52 as seen in a vehicle side view. Note that a position further toward the rear side than the projecting portion 26 means a position that, as seen in a vehicle plan view, is further toward the vehicle longitudinal direction rear side than an imaginary line T that extends from the front surface 36 that is positioned at the rear end of the projecting portion 26.

Operation and functions of the vehicle body frame structure 50 of the second embodiment are described next.

Figure 7:
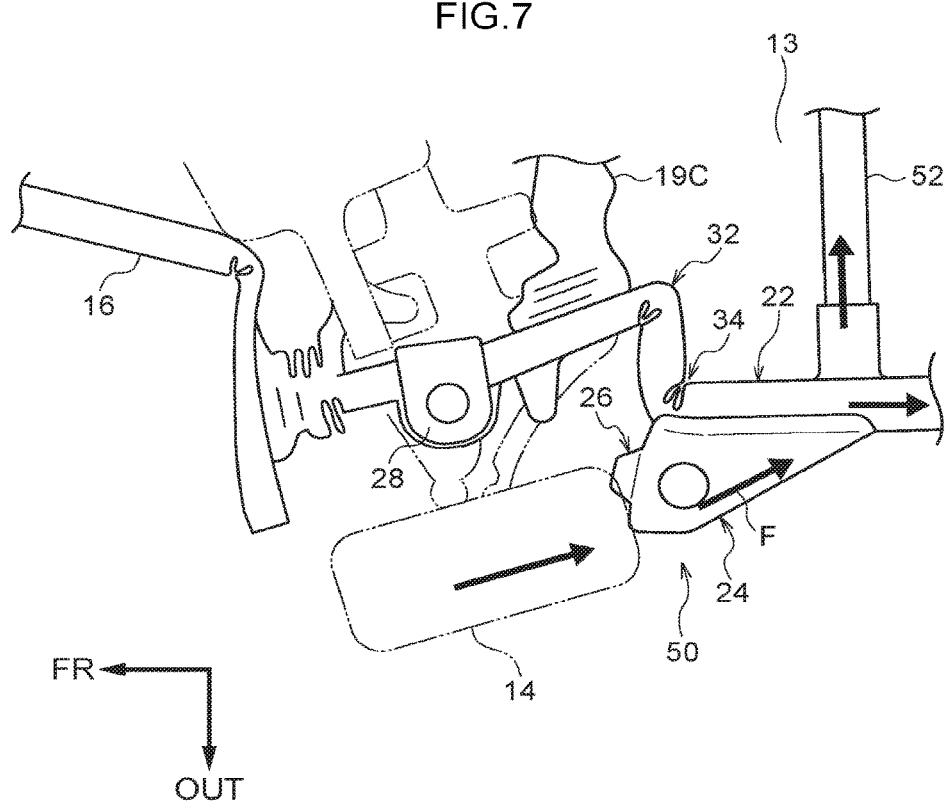
FIG. 7 is an explanatory drawing that shows a deformed state at the time of an offset collision of the vehicle body frame structure relating to the second embodiment.

As shown in FIG. 7, at the vehicle body frame structure 50, the end portion (the joined portion) of the cross member 52 is disposed in the direction of transmission of the collision load F that is inputted to the outrigger 24 due to the front tire 14 contacting the projecting portion 26 at the time of an offset collision. Due thereto, it is easy for the collision load F to be transmitted (dispersed) not only to the side rail 22 but to the cross member 52 as well, and thus, movement of the front tire 14 toward the vehicle cabin 13 side can be suppressed further. Note that the collision load that is inputted to the outrigger 24 is not limited to load that is inputted indirectly via the projecting portion 26, and includes load that is inputted directly from the front tire 14 to the outrigger 24.

Note that the present disclosure is not limited to the above-described embodiment.

Figure 8:
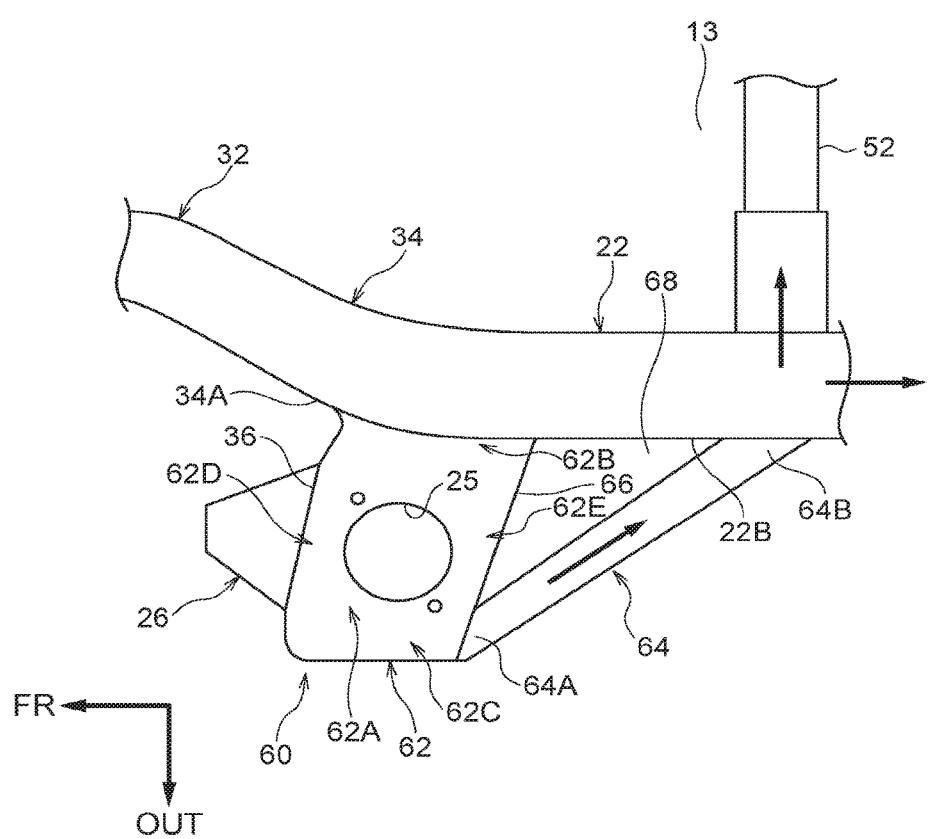
FIG. 8 is a plan view showing a portion of a vehicle body frame structure relating to a modified example.

A vehicle body frame structure 60 is illustrated in FIG. 8 as a modified example of the present embodiment. The vehicle body frame structure 60 is provided in place of the vehicle body frame structure 20 (see FIG. 1) in the vehicle 10 of the first embodiment (see FIG. 1). Note that, at the vehicle body frame structure 60, members and regions that are basically the same as those of the above-described first and second embodiments are denoted by the same reference numerals as in the first and second embodiments, and description thereof is omitted.

The vehicle body frame structure 60 has the side rail 22, an outrigger 62 and a brace 64 that serve as examples of cab mount members, and the projecting portion 26. Further, the cross member 52 is joined to the side rail 22.

The outrigger 62 projects out from the side rail 22 toward the vehicle transverse direction outer side, within a range from the vehicle longitudinal direction rear portion of the second curved portion 34 to the front portion of the intermediate portion 22B. The side rail 22 and the outrigger 62 are welded together. A body (not illustrated in the drawings) is mounted to the outrigger 62. As an example, the outrigger 62 is formed substantially in the shape of a parallelogram as seen in a vehicle plan view, and is structured by a main body portion 62A, a root portion 62B, a distal end portion 62C, a front portion 62D and a rear portion 62E.

The aforementioned mounting hole 25 is formed in the main body portion 62A. The root portion 62B is welded to the outer side surface 34A of the side rail 22. The distal end portion 62C is positioned at the side of the main body portion 62A which side is opposite, in the vehicle transverse direction, the root portion 62B side. The front portion 62D structures the front side portion in the vehicle longitudinal direction with respect to the main body portion 62A. The front portion 62D has the front surface 36. The rear portion 62E structures the rear side portion in the vehicle longitudinal direction with respect to the main body portion 62A. The rear portion 62E has a rear surface 66. The front surface 36 and the rear surface 66 are inclined such that the vehicle transverse direction outer side ends thereof are positioned further toward the vehicle longitudinal direction front side than the inner side ends.

The brace 64 is formed in the shape of an angular tube as an example, and is a closed cross-sectional structure when viewed from the axial direction. One end portion 64A of the brace 64 is welded to the vehicle transverse direction outer side end portion of the rear surface 66. Another end portion 64B of the brace 64 is welded to the vehicle transverse direction outer side surface of the intermediate portion 22B of the side rail 22. The one end portion 64A is disposed at the vehicle longitudinal direction front side and the vehicle transverse direction outer side with respect to the other end portion 64B. Namely, the brace 64 connects the outrigger 62 and the side rail 22 in an inclined direction that intersects the vehicle longitudinal direction. Note that, as an example, as seen in a vehicle plan view, a space portion 68 that is triangular is formed between the side rail 22, the outrigger 62 and the brace 64. Further, as seen in a vehicle side view, the other end portion 64B of the brace 64 and the cross member 52 are disposed so as to overlap one another.

At the vehicle body frame structure 60, the collision load, which is inputted to the outrigger 62 due to a front tire contacting the projecting portion 26 at the time of an offset collision, is transmitted via the brace 64 to the side rail 22. The end portion of the cross member 52 is disposed in the direction of transmission of the load. Due thereto, it is easy for the collision load, which is inputted from the projecting portion 26 to the outrigger 62, to be transmitted (dispersed) via the brace 64 not only to the side rail 22 but to the cross member 52 as well. Thus, movement of the front tire 14 (see FIG. 1) toward the vehicle cabin 13 side may be suppressed.

In the vehicle body frame structure 20, 50, 60, the first curved portion 32 and the second curved portion 34 do not have to be formed at the side rail 22. For example, a bent portion that is crank-shaped as seen in a vehicle plan view may be formed at the side rail 22. Further, a weak portion (a bead or the like), whose yield strength is lower than the yield strength of the other regions of the side rail 22, may be formed at the side rail 22, and this weak portion may be the starting point of deformation at the time of a collision. Note that, in a case in which deformation of the side rail 22 is not restricted, the end point G of the outrigger 24 may be disposed further toward the vehicle longitudinal direction front side than point E.

Further, in the vehicle body frame structure 20, 50, 60, the vehicle transverse direction outer side end and inner side end of the front surface 36 may be lined-up (aligned) in the vehicle transverse direction. Moreover, in the vehicle body frame structure 20, 50, the first side surface 26C of the projecting portion 26 may be structured by plural inclined surfaces that are inclined in plural directions as seen in a vehicle plan view. Further, the first side surface 26C may be disposed along the vehicle longitudinal direction. In addition, the distal end surface 26A and the first side surface 26C of the projecting portion 26 may be formed in arc shapes as seen in a vehicle plan view.

The interior of the projecting portion 26 may be either of hollow or solid. Further, the projecting portion 26 is not limited to being formed integrally with the outrigger 24, 62, and may be structured by another member (e.g., a bracket) that is mounted to the outrigger 24, 62 by joining or fastening. Moreover, the height in the vehicle vertical direction of the projecting portion 26 may differ in at least one of the vehicle longitudinal direction and the vehicle transverse direction.

The placement of the projecting portion 26 with respect to the outrigger 24, 62 is not limited to a place that matches the vehicle transverse direction central portion of the outrigger 24, 62, and may be disposed so as to be offset toward one of the vehicle transverse direction inner side or outer side of the outrigger 24, 62. Further, the material of the projecting portion 26 and the material of the outrigger 24, 62 may be the same or may be different. Moreover, the height of the projecting portion 26 in the vehicle vertical direction may be higher than the height of the outrigger 24, 62 in the vehicle vertical direction.

The outrigger 24 is not limited to a structure in which a member of a preset size is disposed so as to match the position of the cross member 52. The outrigger 24 may be a structure in which the rear portion 24E is enlarged toward the vehicle rear side so as to match the position of the cross member 52.

Vehicle body frame structures relating to first and second embodiments and modified examples of the present disclosure have been described above. However, these embodiments and modified examples may be used by being combined appropriately, and the present disclosure can of course be embodied in various forms within a scope that does not depart from the gist thereof.

What is claimed is:

1. A vehicle body frame structure comprising:
   a side rail extending in a vehicle longitudinal direction and disposed so as to face a front tire in a vehicle transverse direction;
   a cab mount member projecting toward a vehicle transverse direction outer side, from a region of the side rail that is further toward a vehicle rear side than the front tire, and to which a body is mounted; and
   a projecting portion projecting toward the front tire from a region of the cab mount member that is away from the side rail in the vehicle transverse direction.

2. The vehicle body frame structure of claim 1, wherein:
   a first curved portion, which is curved such that a vehicle longitudinal direction rear side thereof is positioned further toward a vehicle transverse direction outer side than a front side thereof, and a second curved portion, which is disposed further toward a rear side than the first curved portion and is curved so as to run along the vehicle longitudinal direction, are formed at the side rail; and
   as seen in a vehicle plan view, the cab mount member projects toward a vehicle transverse direction outer side from a region that is further toward a vehicle longitudinal direction rear side than an apex of an arc of a vehicle transverse direction outer side surface of the second curved portion.

3. The vehicle body frame structure of claim 1, wherein a facing surface of the cab mount member that faces the front tire in the vehicle longitudinal direction, is inclined such that a vehicle transverse direction outer side end thereof is positioned further toward a vehicle longitudinal direction front side than an inner side end thereof, as seen in a vehicle plan view.

4. The vehicle body frame structure of claim 1, wherein an inclined surface, which is inclined such that a rear end thereof is positioned further toward a vehicle transverse direction outer side than a front end thereof as seen in a vehicle plan view, is formed at a vehicle transverse direction outer side region at the projecting portion.

5. The vehicle body frame structure of claim 1, wherein:
   a cross member that extends in the vehicle transverse direction is joined to the side rail; and
   the cab mount member projects out from the side rail such that, as seen in a vehicle plan view, a vehicle transverse direction end portion of the cross member is disposed further toward a rear side than the projecting portion and further toward a vehicle longitudinal direction front side than an imaginary line that extends from a rear surface at a vehicle longitudinal direction rear side of the cab mount member.

* * * * *